United States Patent

Helfer

Patent Number: 5,719,457
Date of Patent: Feb. 17, 1998

[54] SQUIRREL-CAGE ROTOR FOR AN ASYNCHRONOUS MACHINE

[75] Inventor: Peter Helfer, Wettingen, Switzerland

[73] Assignee: ABB Daimler-Benz Transportation (Schweiz) AG, Zurich, Switzerland

[21] Appl. No.: 663,660

[22] Filed: Jun. 14, 1996

[30] Foreign Application Priority Data

Jun. 14, 1995 [DE] Germany .................. 195 21 700.4

[51] Int. Cl.⁶ .................................................. H02K 17/00
[52] U.S. Cl. .................... 310/211; 310/262; 310/62; 310/182
[58] Field of Search .................... 310/211, 201, 310/182, 262, 51, 125, 67 R, 261, 270

[56] References Cited

U.S. PATENT DOCUMENTS

| | | | |
|---|---|---|---|
| 2,200,126 | 5/1940 | Smith | 172/120 |
| 3,394,908 | 7/1968 | Irvin | 310/51 |
| 3,597,646 | 8/1971 | Lawrenson | 310/166 |
| 3,826,940 | 7/1974 | McKean et al. | 310/211 |
| 4,064,410 | 12/1977 | Roach | 310/211 |
| 4,286,183 | 8/1981 | Montgomery | 310/62 |
| 4,358,700 | 11/1982 | Nottingham et al. | 310/262 |

FOREIGN PATENT DOCUMENTS

| | | |
|---|---|---|
| 10 154 | 8/1955 | Germany . |
| 27 21 211 A1 | 11/1978 | Germany . |
| 42 33 474 C2 | 4/1994 | Germany . |

*Primary Examiner*—Steven L. Stephan
*Assistant Examiner*—Timothy A. Williams
*Attorney, Agent, or Firm*—Oblon, Spivak, McClelland, Maier & Neustadt, P.C.

[57] ABSTRACT

In a squirrel-cage rotor for an asynchronous machine, having a laminated core (2) which is mounted on the shaft (1), held together at both ends by press rings and is intended for accommodating the cage bars (3), the latter are respectively permanently connected to a short-circuiting ring (4) outside the laminated core (2). Each short-circuiting ring (4) is supported in the radial direction by a support ring (6) fixed on the shaft. In order to couple the cage head to the rotor body over the entire speed range of the machine for the purpose of suppressing natural vibrations, the two press rings are axially spaced from the laminated core (2) and simultaneously form the support ring (6) for the short-circuiting ring (4). In order to ensure the ventilation of the winding overhang, there are provided between the end face of the laminated core (2) and the support ring (6) spacer webs (7) which are preferably constructed in one piece with the support ring (6).

7 Claims, 3 Drawing Sheets

5,719,457

1

SQUIRREL-CAGE ROTOR FOR AN ASYNCHRONOUS MACHINE

BACKGROUND OF THE INVENTION

1. Field of the Invention

The invention relates to a squirrel-cage rotor for an asynchronous machine, having a laminated core which is mounted on the shaft, held together at both ends by press rings and is intended for accommodating the cage bars, which are respectively permanently connected to a short-circuiting ring outside the laminated core, and each short-circuiting ring is supported in the radial direction by a support ring fixed on the shaft.

The invention proceeds here from a prior art such as emerges from, for example, DE 27 21 211 A1.

2. Discussion of Background

In fast-running asynchronous motors, the ends, projecting from the laminated core at both ends, of the cage bars and the short-circuiting rings connected to them are particularly strongly stressed by high temperatures in conjunction with large centrifugal forces, and put at risk by uncontrolled unbalances. Moreover, in the region of the exposed winding (winding overhang), each barred cage structure has a capacity for vibration in the radial and in the circumferential directions, which, particularly in the case of traction motors, can lead to harmful resonant vibrations because it is virtually impossible to place the natural frequencies outside the exciter frequencies, e.g. from the gearing (pinion teeth).

In order to control the centrifugal forces in the region of the short-circuiting rings of an asynchronous machine, use has been made for many years of shrink rings, which are pushed over the short-circuiting ring. The shrink ring serves the purpose only of mechanical support against bending. The entire structure continues to be capable of vibration.

In the squirrel-cage rotor disclosed in DE 27 21 211 A1, each short-circuiting ring is secured by a centering ring fixed on the shaft. The centering ring bears, with its inside, under axial pressure against the neighboring end face of the cage bars, and the free portion of the inner end face of the centering ring has an annular cutout against whose lateral surface there bears, at a spacing from the annular groove end face, the outer annular surface of an axial projection of the short-circuiting ring, whose inner annular surface surrounds the shaft at a radial spacing.

The known structure has good damping characteristics against forced vibrations and resonant vibrations. However, it is basically suitable only for small motors with a small rotor diameter, because the comparatively solid centering ring impairs the cooling of the rotor, in particular optimum flow through the cage head.

Another way to increase the stiffness of the cage head of an asynchronous machine with respect to torsional vibration is shown in DE 42 33 474 C2. There, the cage bars, which project axially at the ends, are subdivided in the end region in such a way that separate bar ends situated radially one above another are formed, and the bar ends respectively belonging to one groove are offset tangentially in opposite senses. This structure is very complicated and is capable of influencing the radial stiffness of the winding overhang only to a comparatively slight extent.

SUMMARY OF THE INVENTION

Accordingly, one object of this invention is to provide a novel squirrel-cage rotor for asynchronous machines, whose cage head is coupled to the rotor body over the entire speed

2 range of the machine in such a way that no natural vibrations, or only damped natural vibrations, can occur.

This object is achieved according to the invention when the two press rings are axially spaced from the laminated core and simultaneously form the support ring for the short-circuiting ring, and there are provided between the end face of the laminated core and the support ring spacer webs which are preferably constructed in one piece with the support ring.

The advantage of the invention is to be seen, in particular, in that, in this way, the cage head is also coupled to the rotor body over the entire speed range of the machine, starting already at low speeds, in such a way that no natural vibrations, or only damped natural vibrations, can occur. The solution according to the invention takes account simultaneously in this case of changes in the size of the squirrel-cage winding which result from the centrifugal force and thermal expansion in the cage material with respect to the rotor body.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
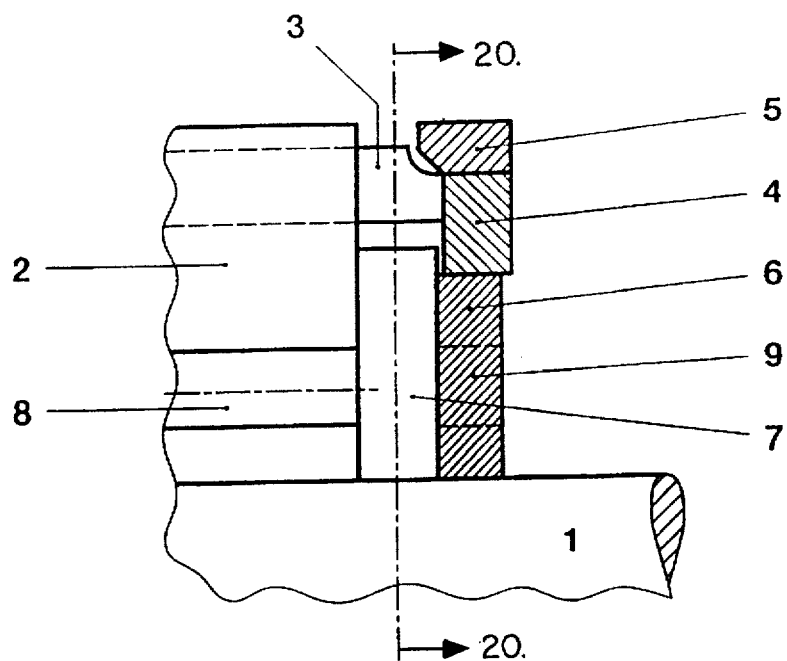
FIG. 1 shows a first embodiment of the invention in the form of a longitudinal section through the end part of a squirrel-cage rotor, the support essentially being produced by a shrink ring.

Referring now to the drawings, wherein like reference numerals designate identical or corresponding parts throughout the several views, in FIG. 1 a laminated core 2 is mounted in the usual way on a shaft 1. On the outer circumference, the laminated core has axially extending grooves into which cage bars 3 are inserted and secured radially there against the influence of centrifugal force. The cage bars 3 project beyond the laminated core 2 and are connected to a short-circuiting ring 4 which is clearly spaced from the end face of the laminated core 2. The projecting ends of the cage bars 3 and the short-circuiting ring 4 form a so-called winding overhang.

The ends of the cage bars 3 taper in the radial direction. A shrink ring 5 is pushed over the short-circuiting ring 4. Arranged in the annular space between the shaft 1 and the short-circuiting ring 4 is a support ring 6 which is permanently connected to the shaft 1, for example is shrunk onto the latter, and bears, over its entire outer circumference, against the inner circumference of the short-circuiting ring 4. This support ring 6 is spaced from the end face of the laminated core 2. On its side facing the laminated core 2, it has a plurality of radially extending webs or ribs 7. The latter serve both as spacing with respect to the laminated core 2 and as press fingers for the laminated core 2. The support ring simultaneously assumes the function of the press ring for the laminated core 2. The axial fixing of the support ring is performed in the same way as is described in DE 27 21 211 A1 mentioned at the beginning.

Upon cooling of the shrink ring 5, the shrinking force initially acts on the short-circuiting ring 4 and then on the support ring 6. The prestressing of the shrink ring 5 is dimensioned in this case such that at no operating point on the machine is there cancellation of the frictional locking between the inner lateral surface of the short-circuiting ring 4 and the outer lateral surface of the support ring 6.

As is very clear from FIG. 1, the described support structure only insubstantially hinders the ventilation of the cage head, which is subjected to a high electrical stress. The cooling air can flow radially outward in a virtually unhindered manner from the axial cooling air bores 8 in the laminated core 2 through the spacings between the webs 7. If required, moreover, it is also possible to provide in the support ring 6 through-bores 9 which are respectively situated between two neighboring webs 7, but need not necessarily be aligned with the cooling air bores 8.

Figure 2:
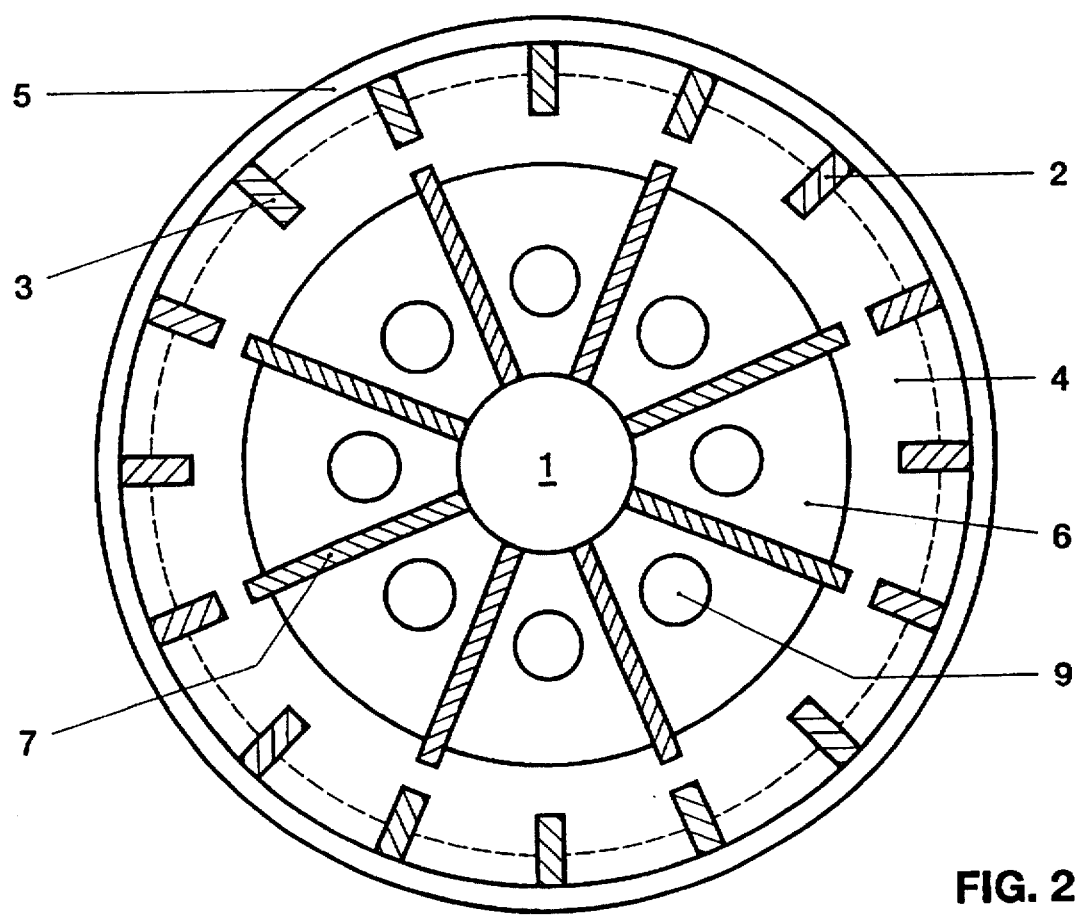
FIG. 2 shows a cross section through the end part at the level of the press ring of the squirrel-cage rotor in accordance with FIG. 1, along line 20 therein.
Figure 3:
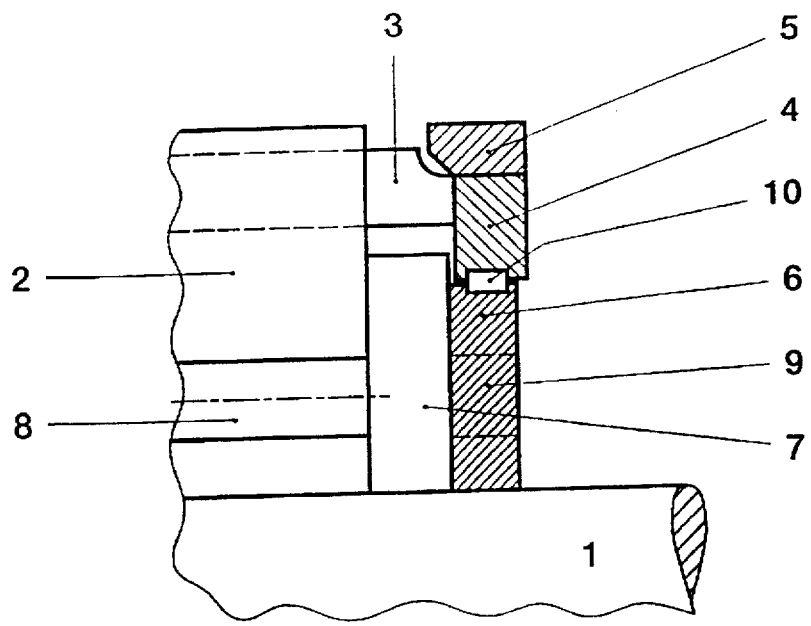
FIG. 3 shows a first modification of the embodiment of FIG. 1, having an elastic member between the short-circuiting ring and the support ring.

In that development which is of the squirrel-cage rotor according to FIGS. 1 and 2, represented in FIG. 3, the coupling of the short-circuiting ring 4 to the support ring 6 is assisted by an elastic member, for example a corrugated spring 10. This corrugated spring 10 is situated partly in a circumferential groove in the outer lateral surface of the support ring 6 and partly in the inner lateral surface of the short-circuiting ring 4. In a fashion analogous to the embodiment according to FIG. 1, the short-circuiting ring 4 and support ring 6 are supported directly on one another. The corrugated spring 10 in this case ensures the coupling for the case in which there is, after all, cancellation of the frictional locking.

Figure 4:
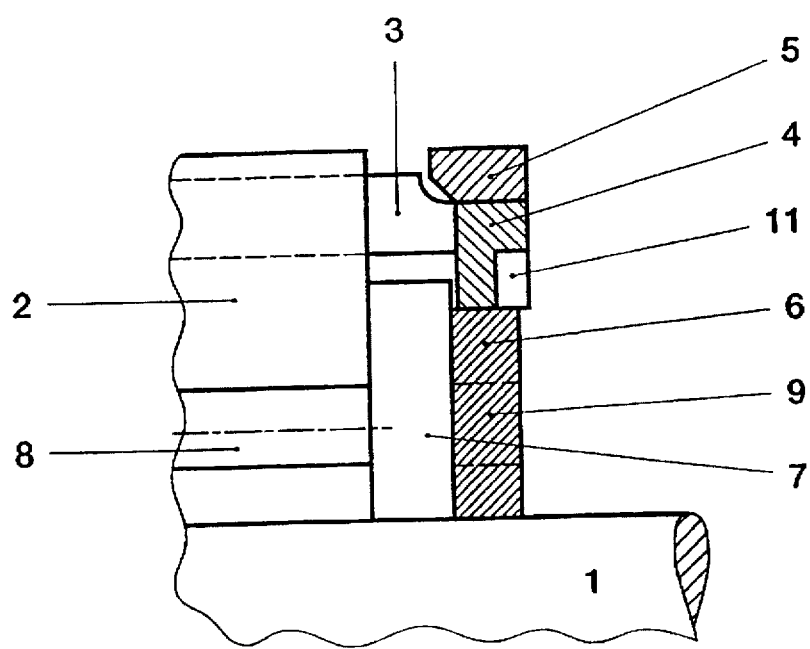
FIG. 4 shows a second embodiment of a squirrel-cage rotor, having a short-circuiting ring provided with material cutouts.
Figure 5:
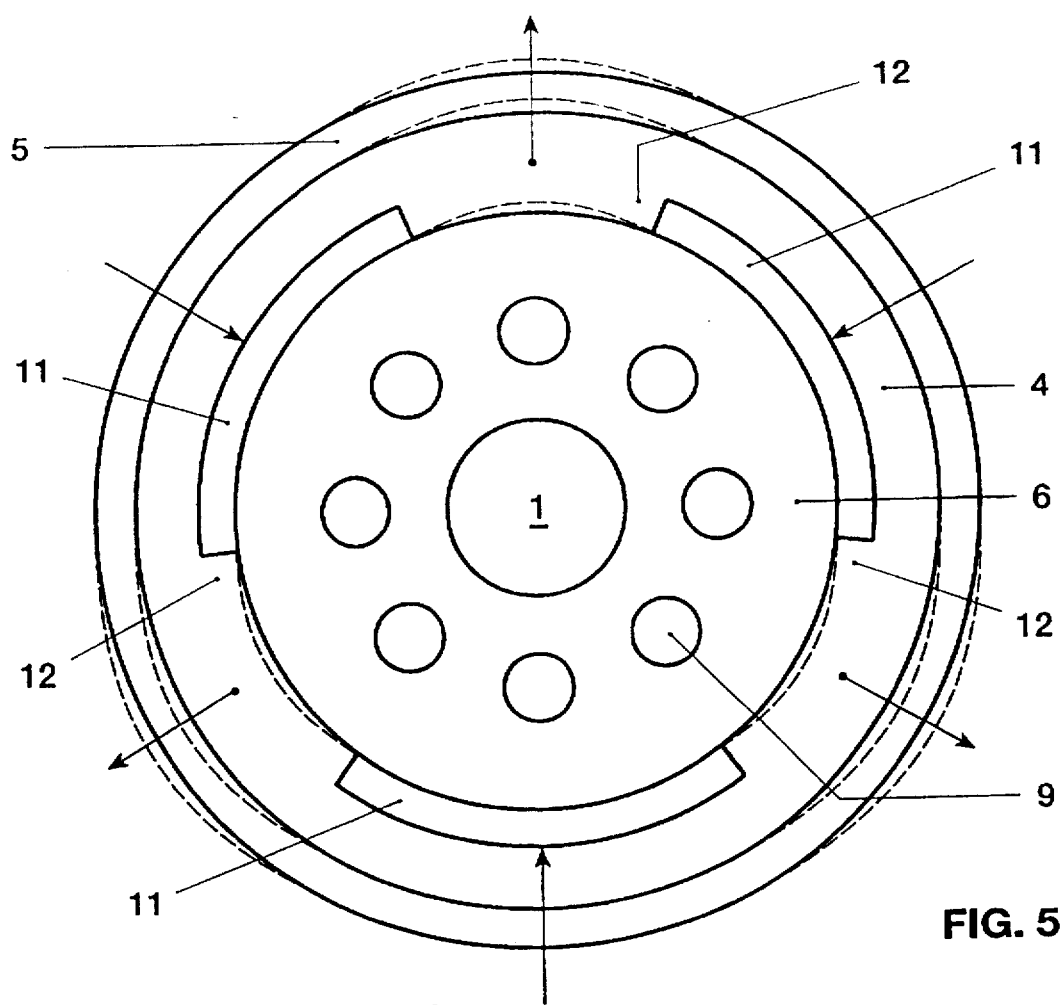
FIG. 5 shows a plan view of the end face of the squirrel-cage rotor according to FIG. 4.

In that embodiment of the invention which is represented in FIGS. 4 and 5, the frictional locking, and thus the coupling between the short-circuiting ring 4 and support ring 6, are ensured by a special configuration of the short-circuiting ring. Instead of a short-circuiting ring with a uniform cross section in the circumferential direction, the short-circuiting ring 4 used here has an intentional anisotrophy in the circumferential direction. This anisotrophy is achieved by providing material cutouts 11 on the sections, three sections in the case of the example, of the short-circuiting ring 4. Said cutouts are distributed uniformly over the inner circumference of the short-circuiting ring and extend approximately over an angle of 60° to 90° in each case. In the zone 12 between the material cutouts, virtually the entire width of the short-circuiting ring 4 is situated on the support ring 6, whereas, in the region of the material cutouts 11, it has only approximately half its (original) ring width. During operation of the machine, it is a consequence of this anisotrophy that both the short-circuiting ring 4 and the shrink ring 5 change shape under the effect of centrifugal force, this being illustrated in the plan view according to FIG. 5 by dashes and in an exaggeratedly large fashion. This change in shape results in forces in the radial direction, which are symbolized by arrows in FIG. 5 and tend to strengthen the coupling via the frictional locking in the zones 12.

The anisotrophy outlined can, of course, also be achieved by providing material additions distributed over the inner circumference of the short-circuiting ring 4 instead of material cutouts 11, this not being expressly represented in FIGS. 4 and 5.

Figure 6:
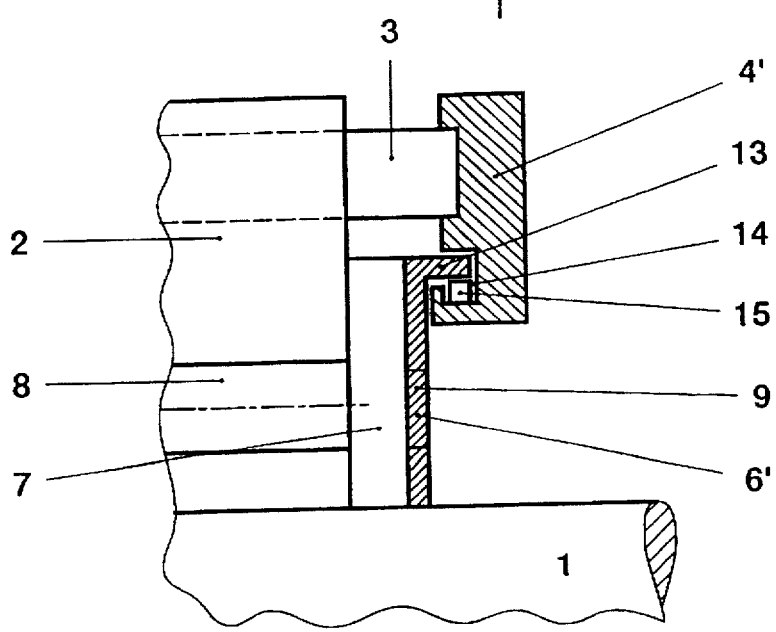
FIG. 6 shows a third embodiment of the squirrel-cage rotor, having a support ring which engages in a groove in the short-circuiting ring and contains an elastic member.

Without going beyond the scope set out by the invention, in the case of soldered squirrel-cage windings made from alloyed conductor material of relatively high strength, the coupling of the short-circuiting ring to the support ring can also be performed in such a way that the support ring 6' has, on the outer circumference, an axially outwardly directed projection 13 which dips into an annular groove 14 on that end face of the short-circuiting ring 4' which faces the laminated core 2 (FIG. 6). In accordance with a first variant, here the axial projection 13 on the support ring 6' bears, with its shaft-side lateral surface, against the shaft-side groove wall. In the limiting case, it can even dip in a positively locking fashion into the groove 14 on the short-circuiting ring 4'. This produces a coupling which becomes stronger progressively with heating and speed. In order to keep the stressing of the projection 13 on the support ring 6' within bounds, it is advantageous to insert an elastic member, preferably a corrugated spring 15, between the inner lateral surface of the projection 13 and the groove wall near the axis.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States of is:

1. A squirrel-cage rotor for an asynchronous machine, comprising:

a shaft;

a laminated core having end faces;

cage bars;

short-circuiting rings;

a support ring comprising press rings;

spacer webs;

elastic members; and shrink rings;

the laminated core is mounted on the shaft, held together at the end faces by the press rings, and accommodates the cage bars;

the cage bars are permanently connected between the short-circuiting rings;

the short-circuiting rings are located at the end faces of the laminated core, and are supported in a radial direction by the press rings which are fixed on the shaft;

the press rings are axially spaced from the laminated core and form the support ring which supports the short-circuiting rings;

the spacer webs are respectively provided between the end faces of the laminated core and the press rings, and are constructed in a one piece construction with the respective press rings;

the short-circuiting rings are respectively pressed onto the press rings by the shrink rings which surround the short-circuiting rings;

the elastic members are respectively interposed between the short-circuiting rings and the press rings; and the short-circuiting rings respectively rest with entire inner circumferences thereof on outer circumferences of the press rings.

2. The squirrel-cage rotor as claimed in claim 1, wherein there is respectively provided on the outer circumferences of the press rings, and/or on the inner circumferences of the short-circuiting rings, grooves in which the elastic members, each elastic member comprising a corrugated spring, are inserted.

3. The squirrel-cage rotor as claimed in claim 1, wherein the short-circuiting rings have material cutouts on inner circumferences thereof, at three or more zones which are distributed uniformly over the the inner circumferences.

4. A squirrel-cage rotor for an asynchronous machine, comprising:

a shaft;

a laminated core having end faces;

cage bars;

short-circuiting rings;

a support ring comprising press rings;

spacer webs;

elastic members; and shrink rings;

the laminated core is mounted on the shaft, held together at the end faces by the press rings, and accommodates the cage bars;

the cage bars are permanently connected between the short-circuiting rings;

the short-circuiting rings are located at the end faces of the laminated core, and are supported in a radial direction by the press rings which are fixed on the shaft;

the press rings are axially spaced from the laminated core and form the support ring which supports the short-circuiting rings;

the spacer webs are respectively provided between the end faces of the laminated core and the press rings, and are constructed in a one piece construction with the respective press rings;

the short-circuiting rings respectively rest with their inner circumferences directly or partly on outer circumferences of the press rings;

the short-circuiting rings are respectively pressed onto the press rings by the shrink rings which surround the short-circuiting rings;

the elastic members are respectively interposed between the short-circuiting rings and the press rings; and the short-circuiting rings have material accumulations on inner circumferences thereof, at three or more points which are distributed uniformly over the the inner circumferences.

5. A squirrel-cage rotor for an as asynchronous machine, comprising:

a shaft;

a laminated core having end faces;

ease bars;

short-circuiting rings;

a support ring comprising press rings; and spacer webs;

the laminated core is mounted on the shaft, held together at the end faces by the press rings, and accommodates cage bars;

the cage bars are permanently connected between the short-circuiting rings;

the short-circuiting rings are located at the end faces of the laminated core, and are supported in a radial direction by the press rings which are fixed on the shaft;

the press rings are axially spaced from the laminated core and form the support ring which supports the short-circuiting rings;

the spacer webs are respectively provided between the end faces of the laminated core and the press rings, and are constructed in a one piece construction with the respective press rings; and the support rings have, on outer circumferences thereof, an axially outwardly directed projection which dips into an annular groove on an end face of the short-circuiting rings which faces the laminated core.

6. The squirrel-cage rotor as claimed in claim 5, wherein the axial projection on the press rings bears, with its shaft-side lateral surface, against the shaft-side groove wall and, in a self-closed fashion into the groove on the short-circuiting rings.

7. The squirrel-cage rotor as claimed in claim 5, further comprising:

an elastic member, comprising a corrugated spring, inserted between all inner lateral surface of the projection and the groove wall which is closet to the axis of the shaft, of each of the short-circuiting rings.

* * * * *